UNITED STATES PATENT OFFICE.

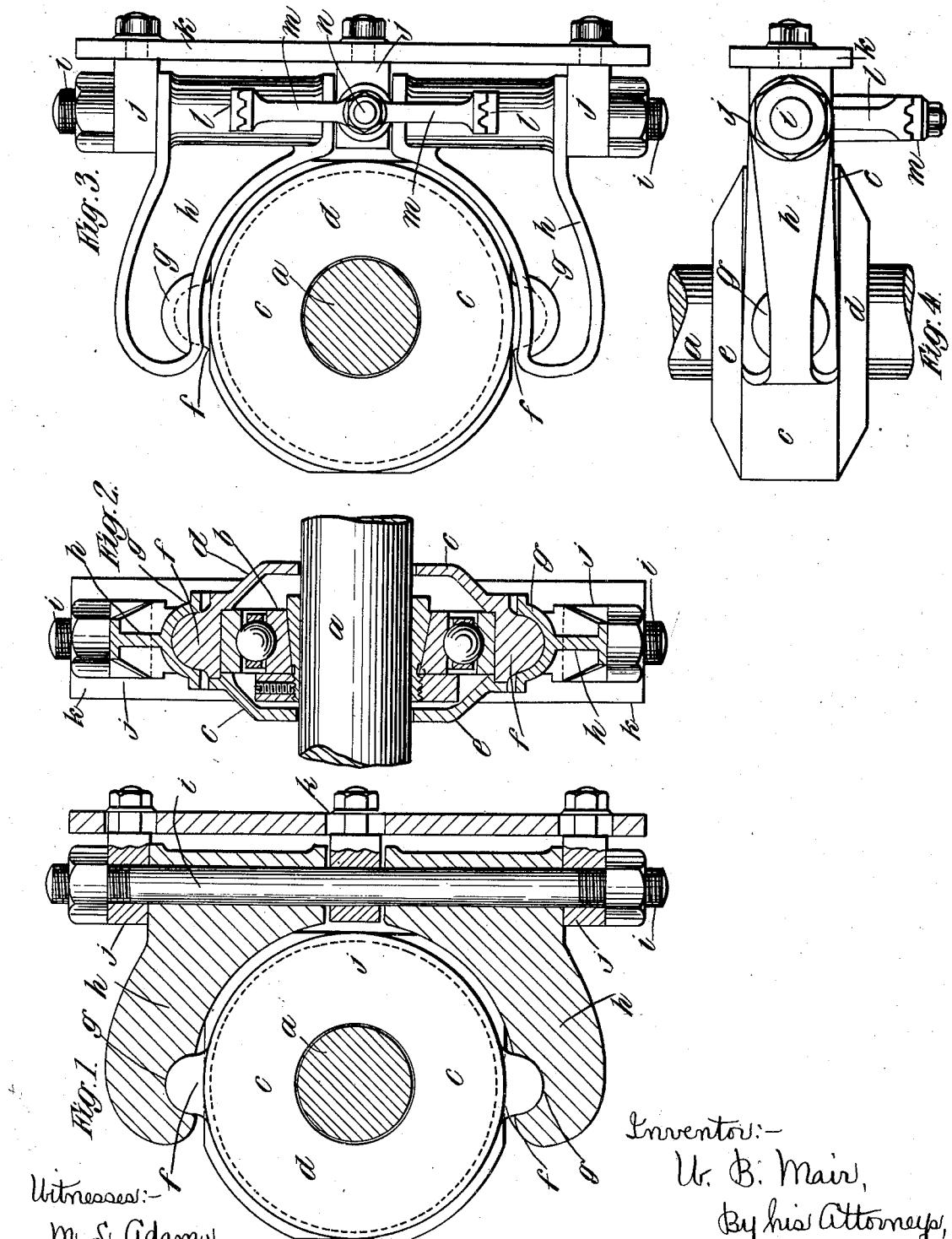

WILLIAM BRUCE MAIR, OF KETTERING, ENGLAND.

SELF-ALINING BEARING FOR SHAFTING.

No. 889,704.     Specification of Letters Patent.     Patented June 2, 1908.

Application filed June 17, 1907. Serial No. 379,414.

*To all whom it may concern:*

Be it known that I, WILLIAM BRUCE MAIR, a subject of His Majesty the King of England, residing at Kettering, in the county of Northampton, in the Kingdom of England, have invented certain new and useful Improvements in and Relating to Self-Alining Bearings for Shafting, of which the following is a specification.

My invention relates to self-alining bearings for shafting of the class permitting motion or swiveling in two planes, one at or about at right angles to the other. There are many types of such bearings, but the one to which my invention is directed is that wherein the bearing proper is supported in a ring furnished with four pivots arranged in pairs at right angles to one another by which it is suspended in a fixed support connected to, or forming a part of, a bracket or soleplate fixing the bearing in position, and is thus capable of oscillating in two planes. These bearings efficiently provide for self-alinement to meet the shafts being, for instance, out of true, but they do not admit of longitudinal movement to meet variations in the length of the shafts arising from heating, cooling and so forth. The latter provision, though desirable in plain bearings, is very essential in ball and roller bearings which are now being largely adopted, but in consequence of the lack of it their complete success is prevented.

Now the object of my invention is to provide a bearing permitting not only self-alining, but also the endwise movement of the shaft in either direction. Accordingly I situate the bearing in a ring which I rotatably mount between two levers in turn pivoted at right angles thereto on a bracket or sole-plate whereby the ring is free to swivel and the levers are at liberty to move together or independently of one another, and thus the bearing can oscillate in opposed planes to preserve alinement and accommodate the endwise movement of the shaft. In one or more bearings of a line of shafting it is, however, necessary to furnish means in connection with it or them for constraining the levers to only move together and oppositely for the purpose of preventing endwise movement of the shaft at the point where such bearing is located, which endwise movement, of course, must not occur.

I will now fully explain my invention with reference to the accompanying drawings which, by way of example, illustrate a wall-bearing embodying it, the bearing proper being of the ball kind.

In these drawings:—Figure 1 is a side sectional elevation; and Fig. 2 is a front sectional elevation thereof. Fig. 3 is an elevation showing one form of the means for preventing the end motion of the shaft as aforesaid; and Fig. 4 is a plan thereof.

The same letters of reference are used throughout to designate the same parts, and, of them, $a$ denotes the shaft and $b$ the bearing proper which, as will be seen from Fig. 2, may be of any appropriate construction. The bearing $b$ is inclosed in a ring which may take the form of a cylindrical housing $c$ consisting of two parts $d$ and $e$ suitably secured together, the part $e$ serving as a cover capable of being easily removed to afford access to the bearing $b$.

The ring or housing $c$ is furnished with two diametrically-opposed trunnions or pivots $f, f$, preferably of spherical contour, which are supported in corresponding seats $g, g$ formed in a pair of levers $h, h$ pivoted on a bolt $i$ mounted in lugs $j, j, j$ on a bracket or sole-plate $k$ by, and through which the bearing is secured in the desired position, which may be vertical as represented, or horizontal, or inclined. The lugs $j, j, j$ are shown adjustable on the bracket or sole-plate $k$ for permitting the adjustment of the levers $h, h$, though, obviously, the latter purpose may be attained in other ways allowing the lugs to be fixed or be integral parts of the bracket or sole-plate. Consequently, according to the conditions imported by the shaft $a$, the ring or housing $c$ can swivel of itself in its seats $g, g$ of the levers $h, h$ in one plane; the levers $h, h$ can turn on the bolt $i$ in another plane either separately or together in the same direction or separately in opposite directions irrespective of the movement of the ring or housing $c$; and the ring or housing $c$ can move simultaneously with the levers $h, h$ whether the latter move concomitantly or independently. In short, therefore, there is absolute universality of motion at the bearing under all circumstances arising from the condition of the shaft $a$. Such bearings will be applied at the desired intervals along the line of shafting $a$, but means must be combined with at least one of them for preventing a complete end movement of the shaft $a$, otherwise the desired relationship of the driving and driven connecting mechanism will be prejudicially affected. These means are applied to compel the pair of arms $h, h$ to move together in opposite directions and they may take many forms, one of which is, by way of example, represented in Figs. 3 and 4. According to this form an arm $l$ is fixed to each lever $h$, and a lever $m$ is pivoted on a stud $n$ fixed to the bracket or sole-plate $k$ so that its ends are in coincidence with the free ends of the arms $l, l$. These respective ends are toothed so that the combination of the arms $l, l$ and lever $m$ assimilates three spur or bevel wheels in gear and, in consequence, the levers $h, h$ are always constrained to move together in opposite directions whereby the undesired endwise movement of the shaft $a$ is obviated without, however, affecting the attribute for self-alinement.

From the foregoing the application of the invention to plain and roller bearings will be obvious without further reference, since the arrangement will be the same, or practically the same, as that described. Also, modifications of the invention necessary to conform to particular circumstances or designs, will be apparent.

What I claim and desire to secure by Letters Patent of the United States is:—

1. A self-alining bearing for shafting comprising, in combination, a bearing proper, a ring or housing in which said bearing is situated, a pair of levers between which said ring or housing is rotatably mounted, and a bracket or sole-plate securing the bearing in position and on which said levers are pivoted.

2. A self-alining bearing for shafting comprising, in combination, a bearing proper, a ring or housing in which said bearing is situated having a pair of trunnions or pivots thereon, a pair of levers having seats for the reception of said trunnions or pivots, and a bracket or sole-plate on which said levers are pivoted and which secures the bearing in place.

3. A self-alining bearing for shafting comprising, in combination, a bearing proper, a ring or housing in which said bearing is situated having a pair of trunnions or pivots thereon, a pair of levers having seats for the reception of said trunnions or pivots, a bracket or sole-plate on which said levers are pivoted and which secures the bearing in place, and means for controlling the endwise motion of the shaft.

In testimony whereof, I have hereunto subscribed my name.

WILLIAM BRUCE MAIR.

Witnesses:
  H. D. JAMESON,
  F. L. RAND.